United States Patent
Kerényi et al.

(10) Patent No.: US 6,935,137 B2
(45) Date of Patent: Aug. 30, 2005

(54) METHOD OF AND APPARATUS FOR FORMING DISCHARGE TUBES OF LOW-PRESSURE DISCHARGE LAMPS

(75) Inventors: István Kerényi, Budapest (HU); József Csapó, Budapest (HU); József Tökés, Budapest (HU)

(73) Assignee: General Electric Company, Schenectady, NY (US)

( * ) Notice: Subject to any disclaimer, the term of this patent is extended or adjusted under 35 U.S.C. 154(b) by 535 days.

(21) Appl. No.: 09/974,639

(22) Filed: Oct. 9, 2001

(65) Prior Publication Data

US 2003/0066313 A1 Apr. 10, 2003

(51) Int. Cl.[7] .................. C03B 23/06; C03B 23/045; C03B 23/043
(52) U.S. Cl. ................... 65/110; 65/108; 65/109
(58) Field of Search ............... 65/108, 109, 110

(56) References Cited

U.S. PATENT DOCUMENTS

| | | | | |
|---|---|---|---|---|
| 4,283,217 A | * | 8/1981 | Kawamura | 65/108 |
| 4,422,863 A | * | 12/1983 | Hosoya et al. | 65/110 |
| 4,883,529 A | * | 11/1989 | Nishimura et al. | 65/281 |
| 5,680,005 A | * | 10/1997 | Soules et al. | 313/493 |
| 5,705,883 A | * | 1/1998 | Soules et al. | 313/318.09 |
| 5,751,104 A | * | 5/1998 | Soules et al. | 313/493 |
| 5,766,295 A | * | 6/1998 | Oga et al. | 65/108 |
| 5,824,130 A | * | 10/1998 | Oga et al. | 65/276 |
| 5,925,978 A | * | 7/1999 | Holzer | 313/493 |
| 6,064,155 A | * | 5/2000 | Maya et al. | 315/56 |
| 2002/0190625 A1 | * | 12/2002 | Tokes et al. | 313/318.01 |

* cited by examiner

Primary Examiner—Sean Vincent
(74) Attorney, Agent, or Firm—Fay, Sharpe, Fagan, Minnich & McKee, LLP

(57) ABSTRACT

There is disclosed a method for forming a discharge tube for a low-pressure discharge lamp. In the method, an end of a section of the discharge tube is fastened with first clamping means, and a second end of the section in held in an oriented position. The section is heated to a softening temperature, and a bending moment is exerted on the section between the first end and the second end for achieving the desired radius or direction of curvature of the section. The holding of the second end of the section and the exertion of the bending moment on the section are effected at least partly with another re-solidified section of the discharge tube which is adjacent to the softened first section. An apparatus for performing the method is also disclosed. The apparatus comprises first and second clamping means for positioning the ends of a bending section of the discharge tube in an oriented position relative to each other, and for exerting a bending moment on the ends. The second clamping means is also used for positioning the ends of a starting bending section relative to each other. Heating means are provided for heating the bending section to a softening temperature, and controllable support means for positioning the first and second clamping means. Control means are used for synchronizing the operation of the controllable support means. The first and second clamping means and the heating means are suitable for achieving a desired radius or direction of curvature of the bending sections heated to the softening temperature.

15 Claims, 13 Drawing Sheets

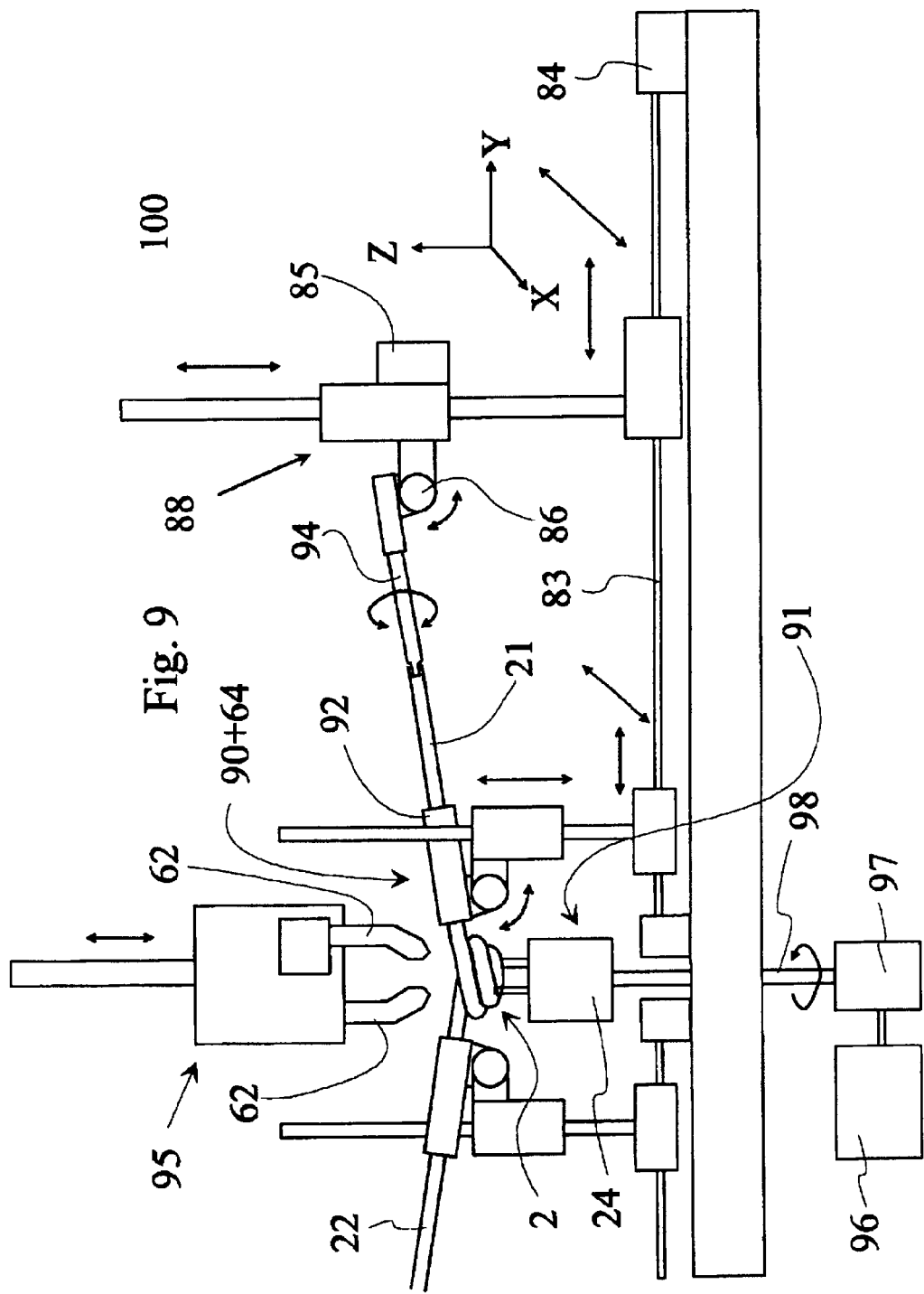

Fig. 19
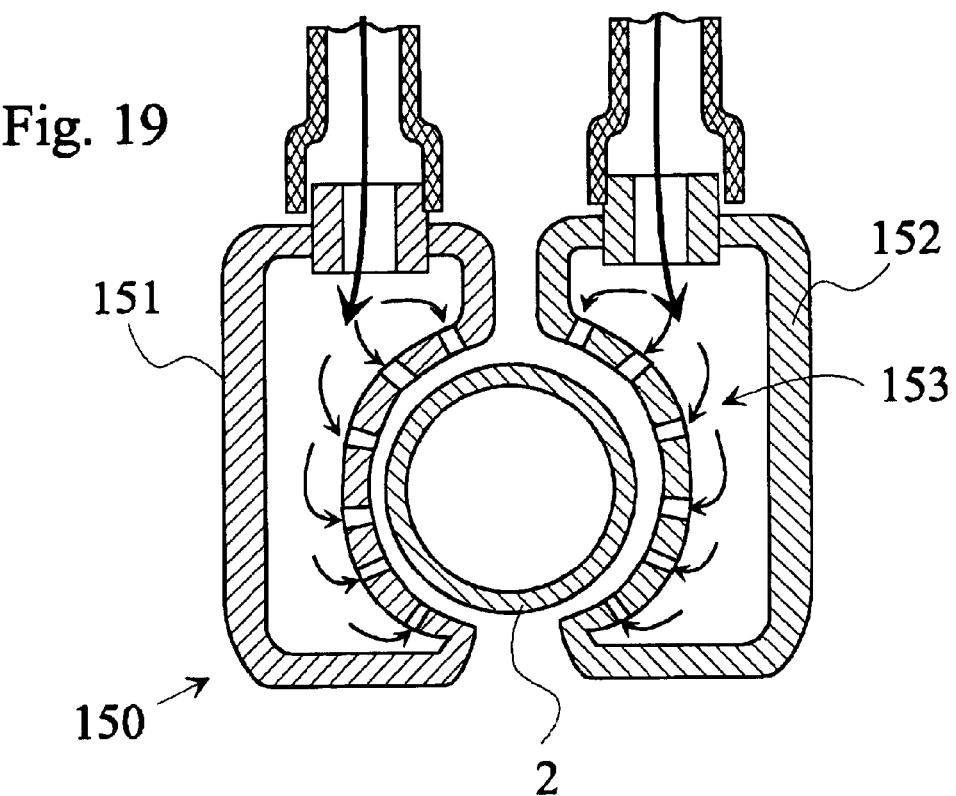
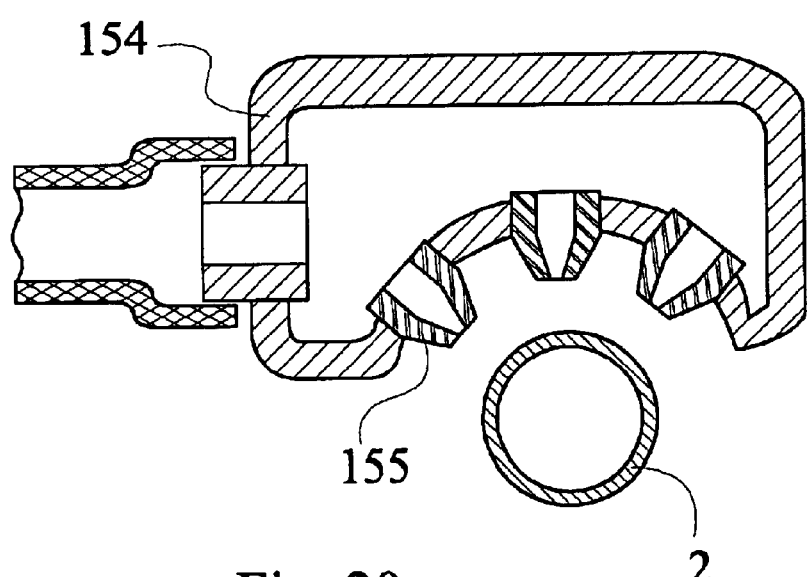
Fig. 20

METHOD OF AND APPARATUS FOR FORMING DISCHARGE TUBES OF LOW-PRESSURE DISCHARGE LAMPS

FIELD OF THE INVENTION

The invention relates to a method of forming a discharge tube for a low-pressure discharge lamp in which the discharge tube has at least one curved section. The invention also relates to an apparatus for implementing the method and for forming a discharge tube for a low-pressure discharge lamp.

BACKGROUND OF THE INVENTION

Low pressure discharge lamps are well known in the art. These lamps contain small doses of mercury which radiates under the influence of the discharge arc. In order to achieve maximum light output, it is desirable to make the discharge tube of the lamp as long as possible. In order to achieve light outputs comparable to the light output of a traditional incandescent bulb, the application of discharge tubes with a length in excess of tens of centimeters is necessary. Such tubes must be folded into various forms, in order to make them compact enough for various lamp shades and covers, which were originally designed for incandescent bulbs.

One of the popular forms of long discharge tubes is that of a double helix or double coil. This configuration is advantageous, because both ends of the discharge tube are positioned at the same ends of the coil, and a relatively long coil is easily attached to the lamp housing. The known double coil type discharge tubes normally has a constant diameter throughout the coil. However, in order to meet customer demand, it would be desirable to produce double coil type lamps with variable diameters, e. g. where the diameter of the coil is smaller towards the lamp housing. Such lamps more resemble traditional pear shaped incandescent bulbs, and hence they are found more attractive by certain customers.

A double helix type compact fluorescent lamp is disclosed in U.S. Pat. No. 5,705,883. Such a double helix configuration results in a compact discharge tube. In the lamp shown in U.S. Pat. No. 5,705,883, the double helix formed by the discharge tube has an essentially constant inner and outer diameter apart from the sealed ends of the discharge tube which are bent inwards. The bending of the tube ends is made in a separate manufacturing step. This lamp may be manufactured by winding the double coil onto a properly shaped mold, and screwing off the discharge tube from the mold. With this method, it is not possible to form a double coil where the parts away from the closed end of the coil have a much smaller diameter than the rest of the coil, because the core mold can not be screwed out. It is possible to break up the mold after the forming of the tube, but it is not feasible in mass production, due to cost and manufacturing time considerations.

Another method and apparatus for forming a coil-shaped discharge tube is disclosed in U.S. Pat. Nos. 5,766,295 and 5,824,130. In this known method, the bending sections of the discharge tube are heated to a softening temperature, and a bending moment is exerted on the bending section with the help of a first and second clamp, and a central rod. This method is only applicable for forming a single-coil shaped discharge tube.

Therefore, there is a need for a method and apparatus for forming the discharge tube of a discharge lamp which has a varying radius or direction of curvature, and particularly where the discharge tube is coil shaped with varying diameter.

SUMMARY OF THE INVENTION

In an embodiment of the present invention, there is provided a method of forming a discharge tube for a low-pressure discharge lamp, where the discharge tube has at least one curved section. The method comprises the following steps:

A first end of a first bending section of the discharge tube is fastened with first clamping means. A second end of the first bending section of the discharge tube is held in an oriented position, relative to the first end. The second end is opposite to the first end of the first bending section. Thereafter, the first bending section is heated to a softening temperature. A bending moment is exerted on the softened first bending section between the first end and the second end of the softened first bending section for achieving the desired radius or direction of curvature of the first bending section. The holding of the second end of the softened first bending section and the exertion of the bending moment on the softened first bending section is effected at least partly with a re-solidified second bending section of the discharge tube. This re-solidified second bending section is adjacent to the softened first bending section.

The suggested method is particularly advantageous for the forming of discharge tubes with varying radius or direction of curvature. Due to the fact that the bending moment on the softened bending section is effected with the re-solidified second bending section, no central molding core is necessary, and coils with various diameters along the coil axis may be manufactured in large series. Further, not only coils, but many other shapes may be produced, the only limitation of the method is the curvature radius which can be achieved with the glass tube. The method is easily applicable simultaneously on two ends of the same glass tube. Thus the two tube portions of the discharge tube forming the strands of a double helix may be easily formed starting from a single integral glass tube, thereby avoiding imperfect joints between discharge tube sections.

In an embodiment of another aspect of the present invention, there is provided an apparatus for forming discharge tube for a low-pressure discharge lamp in which the discharge tube has at least one curved section with a predetermined radius or direction of curvature. The apparatus comprises first clamping means for positioning a first end of a bending section of the discharge tube in an oriented position relative to a second end of the bending section and for exerting a bending moment on the first end. There is provided a second clamping means for positioning a third end of a starting bending section of the discharge tube in an oriented position relative to a fourth end of the starting bending section.

The apparatus also comprises heating means for heating the bending section to a temperature above the softening temperature, and controllable support means for positioning the first and second clamping means in predetermined positions. The apparatus further comprises control means for synchronizing the operation of the controllable support means, and the first and second clamping means and the heating means are suitable for achieving a desired radius or direction of curvature of the bending section being heated to the softening temperature.

The method and the apparatus implementing the method ensures the fast and industrial-scale manufacturing of discharge tubes having various shapes, particularly double helix shaped discharge tubes in which the inner diameter of the double helix is smaller at the end of the helix than the inner diameter of a central portion of the helix. Large scale manufacture of such tube configurations is not feasible with known traditional methods, such as the use of molding cores which are broken after use.

BRIEF DESCRIPTION OF DRAWINGS

The invention will be now described with reference to the enclosed drawings, where FIG. 9 shows the functional structure of the discharge tube manufacturing apparatus, FIG. 19 is a cross section of the discharge tube, and cross section of an embodiment of the cooling means used in the apparatus of FIG. 9, FIG. 20 is a cross section of the discharge tube, and cross section of another embodiment of the cooling means used in the apparatus of FIG. 9.

DETAILED DESCRIPTION OF THE INVENTION

Figure 1:
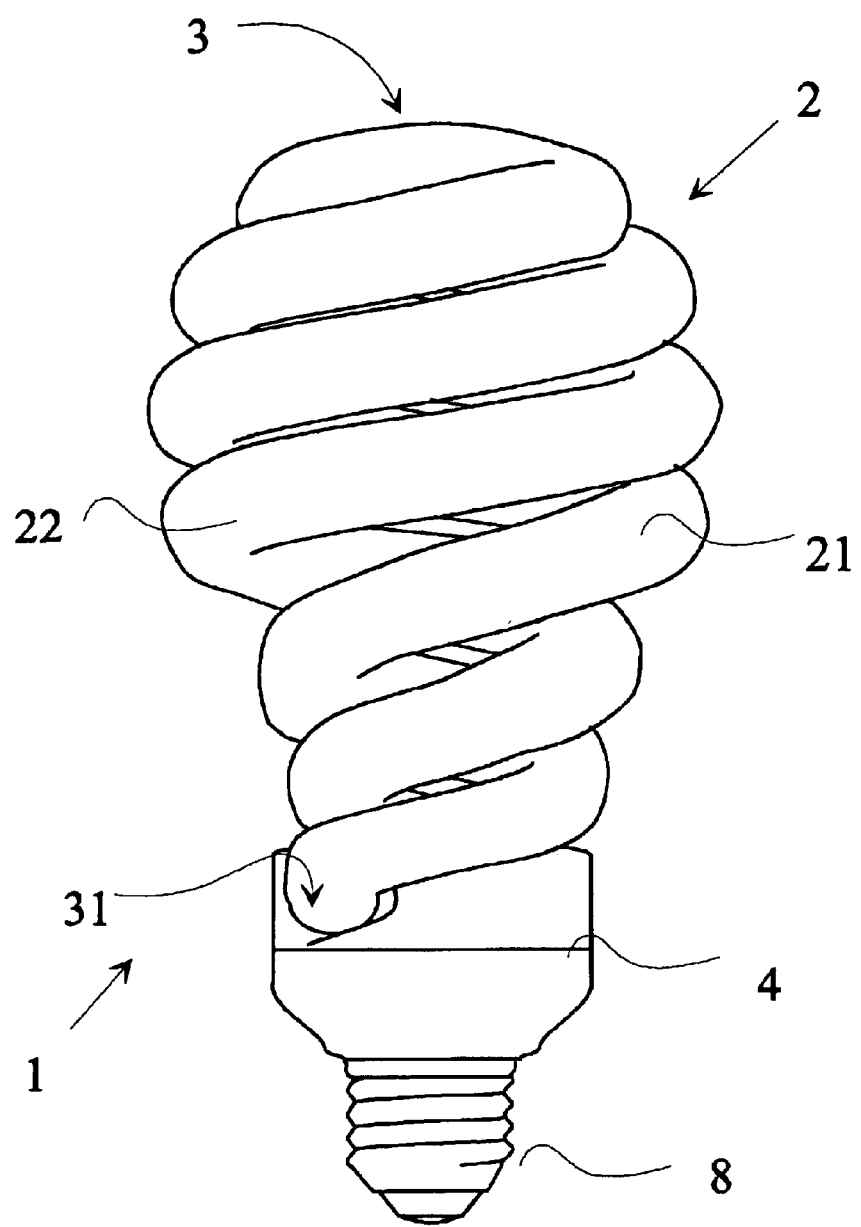
FIG. 1 is a side view of a low pressure discharge lamp with a double helix shaped discharge tube having an essentially pear-shaped enveloping surface.
Figure 2:
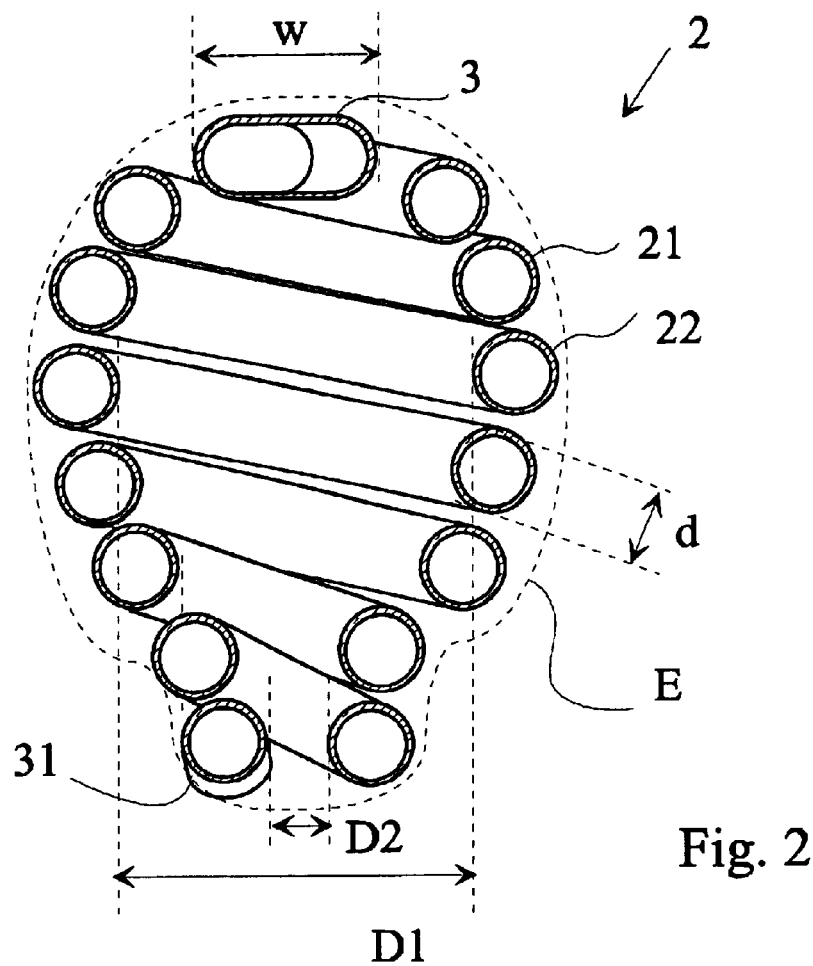
FIG. 2 is a cross section of the discharge tube of the low pressure discharge lamp shown in FIG. 1.
Figure 3:
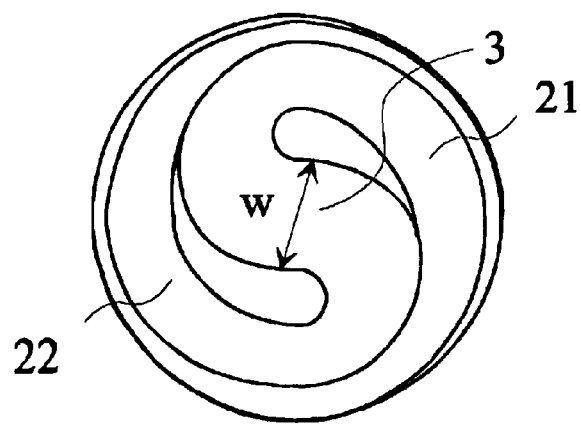
FIG. 3 is a top view of the discharge lamp shown in FIG. 1.

Referring now to FIGS. 1 to 3, there is shown a low pressure arc discharge lamp 1. The lamp 1 has a discharge tube 2, the ends 31 of which are inserted into a lamp housing 4 or base terminal. The lamp 1 of FIG. 1 has two spiral shaped discharge tube portions 21 and 22 which are interconnected through a cold chamber portion 3 at the upper ends of the tube portions 21 and 22 in order to form a double helix.

The discharge tube 2 is mechanically supported by the lamp housing 4. The lamp housing 4 surrounds the ends 31 of the discharge tube 2. More precisely, the sealed ends 31 of the tube portions 21,22 are within the lamp housing 4, while the major part of the tube portions 21,22 is external to the lamp housing 4. The lamp 1 is of a type where light is emitted by a phosphor layer deposited on the inner surface of the discharge tube 2. Such a discharge lamp arrangement is known by itself. In a typical embodiment, the lamp housing 4 is equipped with a screw terminal 8, which fits into a standard screw socket (not shown).

As best seen in FIGS. 2 and 3, the inner diameter D1 of the central section of the double helix is larger than the inner diameter D2 of the lower end section. In the embodiment shown in FIGS. 1 to 3, the discharge tube 2 has an external envelope E that is substantially pear shaped. The cold chamber 3 connects the upper ends of the spiral shaped tube portions 21,22, i. e. those ends opposite to the sealed ends 31. The cold chamber 3 contributes to the control of the mercury partial pressure within the discharge tube, in a manner known by itself. In the embodiment shown in FIGS. 2 and 3, the width w of the cold chamber 3 is larger than the diameter d of the tube portions 21,22. In this manner, the cold chamber 3 has an increased cross-sectional area in which the energy density of the discharge arc decreases, allowing a relative cooling of the wall of the cold chamber 3. Typically, the diameter d of the discharge tube 2 at the tube portions 21,22 is between 10–15 mm, the wall thickness being 0.8–1.2 mm. The width w of the cold chamber 3 is approximately the double of this value, i. e. the value of w is between 20–30 mm for a typical lamp of approximately 42 W power.

The discharge tube 2 shown in FIGS. 1 to 3 is manufactured with the method and apparatus explained with reference to FIGS. 4 to 23.

Figure 4:
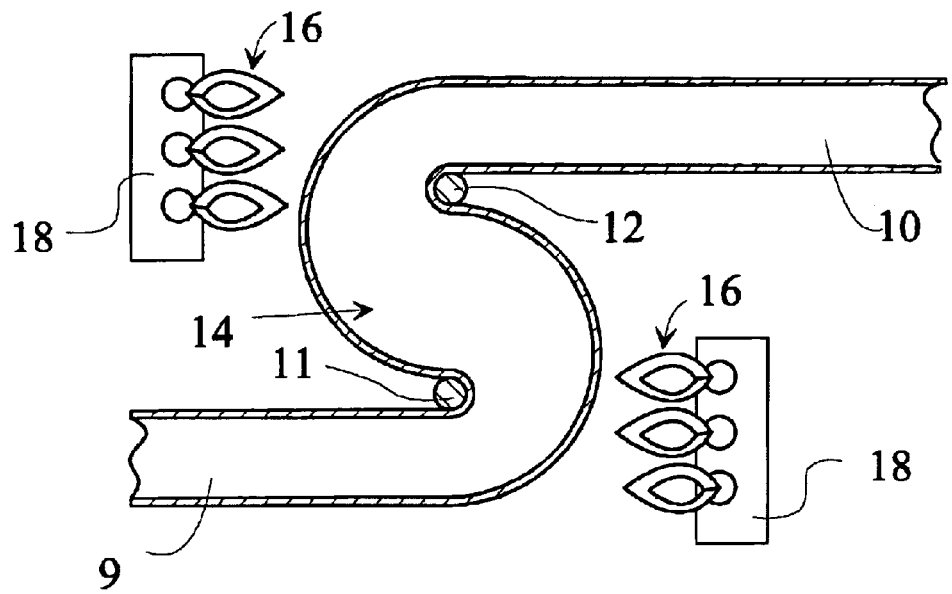
FIG. 4 illustrates an initial manufacturing step of a discharge tube.

The forming of the double helix preferably starts with forming to an S-shape of a central portion 14 of the discharge tube 2. This central portion 14 constitutes the cold chamber 3 of the finished coiled discharge tube 2. The desired shape of the cold chamber 3 is formed, e. g. by blowing or casting the glass into a properly shaped mold, where the desired increased width w of the central portion 14 is achieved. Thereafter, as shown in FIG. 4, the S shape of the discharge tube 2 is formed in this initial step by heating and bending the two free ends 9,10 of the discharge tube around two pins 11,12. The heating is done with conventional methods, e. g. with the flames 16 of a gas burner 18.

Figure 5:
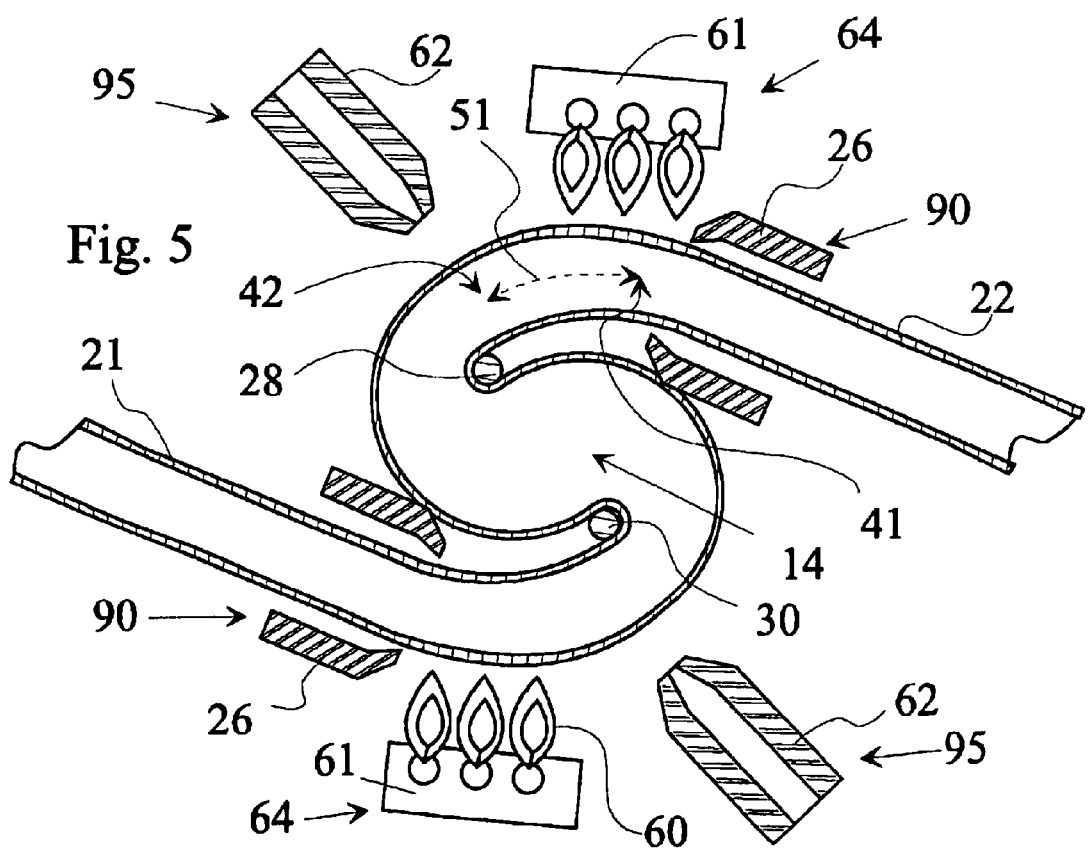
FIG. 5 illustrates a forming step in the manufacturing process of a discharge tube.
Figure 6:
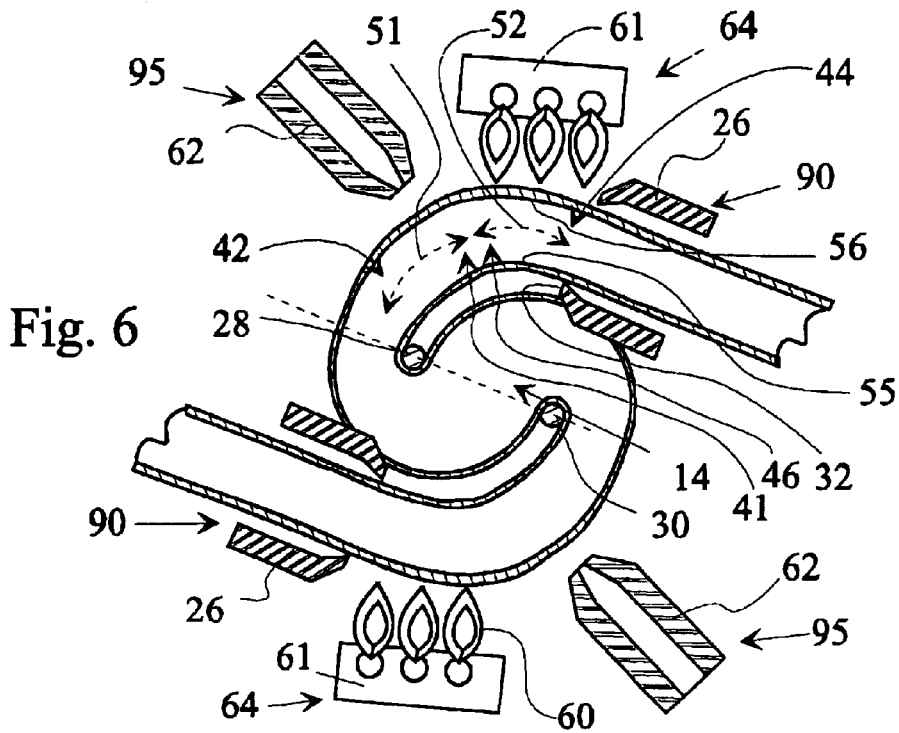
FIG. 6 illustrates a subsequent forming step in the manufacturing process of a discharge tube, following the step shown in FIG. 6.
Figure 7:
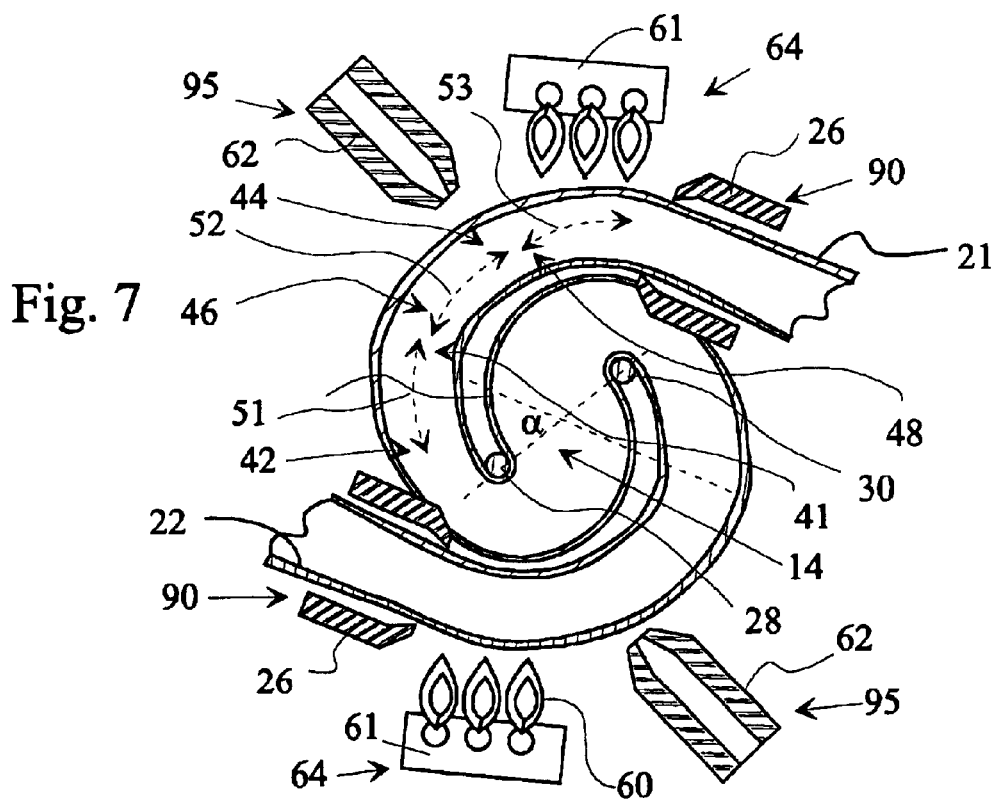
FIG. 7 illustrates a subsequent forming step in the manufacturing process of a discharge tube, following the step shown in FIG. 7.

FIGS. 5 to 7 illustrate that the discharge tube 2 is formed as a double helix by winding it into a coil form with a method explained below. During the winding, the discharge tube 2 is fastened at the central portion 14, while the two legs of the discharge tube 2, in effect the two tube portions 21,22 on two sides of the central portion 14 are wound simultaneously.

The discharge tube 2 is held in oriented position for the purposes of a controlled bending operation by fastening the central portion 14 relative to a first clamping means with appropriate means intended for this purpose. In the embodiment shown in FIGS. 5 to 23, the second clamping means for holding the discharge tube 2 in an oriented position relative to the first clamping means is embodied by a chuck 24 receiving the central portion 14 of the discharge tube 2 (see FIG. 9). The first clamping means 90 may be embodied by a guiding aperture 26. The chuck 24 has two pins 28,30 which are nearly identical in size with the pins 11,12 used for bending the initial S-shape of the central portion 14. During the winding of the discharge tube 2, the chuck 24 is rotated synchronized with the movement of the first clamping means.

The winding of the discharge tube is performed while certain sections of the discharge tube 2 are heated to a softening temperature. Only those sections are heated to the softening temperature which are being bent under the bending forces exerted by the first clamping means and the solid parts of the discharge tube 2, as will be explained below. Though the details of the bending are shown on one of the two tube portions 21,22, the other tube portion is wound symmetrically in the same manner.

The starting step of the tube winding process is illustrated in FIG. 5. As explained above, here the discharge tube 2 is fastened at an end 41 of a starting bending section 51 with the guiding aperture 26 constituting a first clamping means, while the other end 42 of the starting bending section 51 of the discharge tube is also fastened with the pins 28,30 of the chuck 24, constituting second clamping means. The other end 42 of the starting bending section 51 is opposite the end 41 of the bending section 51.

The starting bending section 51 is heated to a softening temperature by the heating means 64, e.g. by a gas burner 61. After reaching the softening temperature, the glass material of the discharge tube becomes ductile. In this instant, bending force is exerted on the discharge tube 2 at the starting section 51, between the end 41 and the end 42 of the softened starting bending section 51. This bending force is controlled by appropriate movement of the first clamping means 90 and the second clamping means relative to each other, i.e. by controlling the rotation of the chuck 24 and the movement of the guiding aperture 26 in order to achieve the desired radius or direction of curvature of the starting bending section 51. Therefore, during the bending of the starting section 51, the fastening of one end 42 of the softened starting section 51 and the exertion of the bending force to the softened starting section 51 is effected with the second clamping means, i.e. the chuck 24. The other component of the bending force is effected by the guiding aperture 26. With other words, here the bending moment is applied to the softened bending section 51 by two external devices. FIG. 5 illustrates the final result of the bending of the starting section 51.

The heating of the starting section 51 is done with conventional methods, e.g. with the flames 60 of the gas burner 61 which is similar to the burners 18. Other suitable heating means may comprise means for blowing of hot air on the parts to be heated, as will be shown below.

The suitable softening temperature of a glass discharge tube 2 is between 500–700° C., dependent on the applied glass type. In case of a discharge tube made of soda lime glass, the softening temperature is approximately 620–700° C. For lead glass, the softening temperature is approximately 500–560° C.

After the softened starting section 51 has been bent, the method for further forming the discharge tube 2 into a coiled configuration is illustrated by FIGS. 6 and 7. Subsequently to the bending of the starting section 51, this bending section 51 starts cooling, either naturally, or under the influence of active cooling means 95, e.g. a cold air nozzle 62, which will be explained below, and the starting bending section cools to a temperature under the softening temperature, and becomes re-solidified.

The next bending section 52 adjacent to the starting bending section 51 is bent in a manner which is different from the procedure used for the bending of the starting bending section 51. The first end 44 of the first bending section 52 is also fastened with the first clamping means, i.e. the guiding aperture 26, while the second end 46 of the first bending section 52 of the discharge tube 2 is held in an oriented position, the second 46 end being opposite the first end 44. The second end 46 of the softened first bending section 52 is towards the re-solidified starting bending section 51. Now this re-solidified starting bending section 51 is adjacent to the first bending section 52.

In the meanwhile, the first bending section 52 is heated to a softening temperature, and a bending moment is exerted on the softened first bending section 52, between the first end 44 and the second end 46 of the softened first bending section 52, for achieving the desired radius or direction of curvature of the first bending section 52. As above, the desired radius or direction of curvature is achieved with the coordinated movement of the first clamping means 90 and the second clamping means. However, in this case the second end 46 of the softened first bending section 52 is not held directly by the second clamping means, i.e. the chuck 24, but by the re-solidified starting bending section 51. Consequently, it is also the re-solidified starting bending section 51 adjacent to the softened first bending section 52, which directly exerts the bending moment on the softened first bending section 52, together with the first clamping means. With other words, the softened first bending section 52 is formed solely under the forces exerted on it by the first clamping means and the end 42 of a re-solidified adjacent section, namely the starting bending section 51. No molding core is used for forming the appropriate curvature, more precisely, the desired radius of curvature or direction of curvature of the first bending section 52.

The desired radius or direction of the curvature is achieved by properly moving, i.e. translating, tilting or rotating the first clamping means 90, as necessary, in an appropriate combination of the movements. Thereby the first end 44 of the softened first bending section 52 is also moved relative to the second end 46 of the first bending section 52, which also means a relative movement to the end of the re-solidified section, i.e. relative to the end 41 of the starting bending section 51 in FIG. 6.

Figure 8:
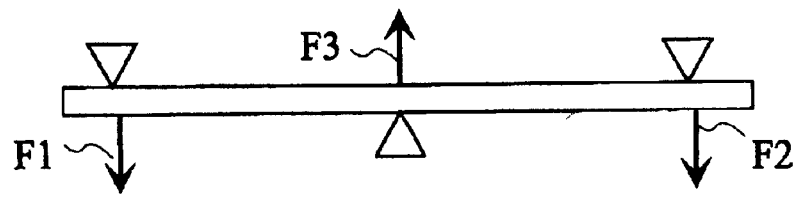
FIG. 8 is a schematic illustration of the bending forces acting on the discharge tube.

Proper bending of an object transversally to its longitudinal axis occurs under the influence of three parallel forces, of which forces F1 and F2 have an opposite direction as compared with the direction of the force F3 acting between F1 and F2, as shown in FIG. 8. The two bending forces corresponding to forces F1 and F2 are provided by the re-solidified tube section and the first clamping means 90. In order to achieve a correct bending of the first bending section 52, it is also foreseen that a bending moment is also exerted on the softened first bending section 52 at least partly by a wall part of the first bending section 52, namely the inner wall part 55, if the external surface of the coil is defined as the outside. In order to be able to exert the bending moment corresponding to the central force F3, the inner wall part 55 need to be somewhat harder than the external wall parts 56, though still soft enough for being bent by the first clamping means and the re-solidified adjacent section.

Alternatively, the bending moment may be exerted on the softened first bending section 52 at least partly by a support member of the first clamping means, e.g. by an extended rim 32 of the guiding aperture 26.

In order to control the bending process, it has been found best if the length l of the softened bending sections is less than six times the diameter d of the discharge tube 2.

FIG. 7. illustrates the next step in the winding process. Essentially, the same process is repeated which has been described with reference to FIG. 6. However, now the next bending section 53 is heated to the softening temperature, while the first bending section 52 has re-solidified in the meanwhile. Comparing FIGS. 6 and 7, it is seen that the pins 28, 30 of the chuck 24 turned further with angle α, and therewith the cold air nozzle 62 cools the first bending section 52, and the gas burner 61 heats the next bending section 53. Now the starting section 51 and the first bending section 52 together constitute a single re-solidified section, the end of which holds the end 48 of the second bending section 53 in an oriented position relative to the first clamping means 90.

While the method has been explained with reference to static and separate softened sections and re-solidified sections shown in FIGS. 5 to 7, it is understood that the softened section of the discharge tube is shifted along the principal longitudinal axis of the discharge tube substantially continuously during the bending process. This means that the transition interface between the re-solidified section and the softened section is also shifted continuously along the axis of the discharge tube 2, while the tube portion 21 passes along the heating means, being fed through the first clamping means 90 by the apparatus shown below. Such a transition interface is found between the end 44 of the first bending section 52 and the end 48 of second bending section 53 in FIG. 7. At the same time, the wound coil is rotated with the pins 28,30 of the chuck 24. Accordingly, the re-solidified section is growing in length continuously.

It is also advisable to preheat the discharge tube 2 before the bending operation, preferably to a temperature in the vicinity of, but below the softening temperature, e. g. to 400–600° C., again dependent on the applied glass type, e. g. to 520° C. with soda lime glass, and 450° C. for lead glass. The pre-heating is done with suitable means, examples of which are shown below. As a result of the pre-heating, the glass is heated up faster to the softening temperature, and the manufacturing process may be speeded up.

The re-solidification of the bent sections—starting section 51 in FIG. 6, starting section 51 and first bending section 52 in FIG. 7—may occur due to a natural passive cooling of the sections, as they move away from the flames 60 of the burner 61. However, in order to better control the bending process, and to increase the manufacturing rate, the bent portions of the discharge tube are actively cooled to a temperature below the solidification temperature after bending. Such an active cooling may be effected with cold gas or with a liquid spray, preferably water. This active cooling is indicated by the air nozzle 62 in FIGS. 5 to 7. Further, the natural convection cooling and the radiation cooling of the glass tube may also be taken into account, when the cooling rate of the bent sections is established.

The apparatus for implementing the above method for forming discharge tube with a predetermined radius or direction of curvature is explained with reference to FIGS. 9 to 23. The apparatus is realized as a complex system with various elements performing different functions. The different parts of the apparatus are controlled in a coordinated manner to implement the controlled bending of the discharge tube.

For this purpose, the apparatus 100 shown in FIG. 9 comprises first clamping means 90 for positioning a first end 44 of the first bending section 52 of the discharge tube 2 in an oriented position relative to the position of a second end 46 of the first bending section 52 (see also FIG. 6). In FIG. 9, the first clamping means 90 is constituted by the tube-like chamber 92 and the end rod 94. The chamber 92 also includes heating means 64 for heating the discharge tube 2 to its softening temperature. The function and structure of the chamber 92 and the end rod 94 is explained with reference to FIGS. 11–13, FIGS. 17–18 and FIGS. 21–23. The first clamping means 90 also functions to exert a bending moment on the first end 44 of a bending section 52.

The apparatus 100 also includes second clamping means 91 for positioning a third end 42 of the starting section 51 of the discharge tube 2 in an oriented position relative to a fourth end 41 of the starting section. As mentioned above, this second clamping means 91 are represented by the chuck 24, which receives the central portion 14 of the discharge tube via the two pins 28,30, and utilizing other fastening means, if necessary, for fastening the central portion 14 to the chuck 24. The chuck 24 can be rotated with an electric motor 96 through the gear 97 and axle 98.

The apparatus 100 also comprises controllable support means for positioning the first and second clamping means in predetermined positions. These controllable support means are realized as mechanical positioning devices, known per se. As shown in FIG. 9, the support means for positioning the first clamping means are realized as a positioning mechanism facilitating the controlled positioning and movement of the chamber 92 and the end rod 94 according to multiple degrees of freedom or according to multiple axes. E.g. the chamber 92 may be moved vertically and horizontally, in all directions, and it may also be tilted around any axis (the rotation around only one of the axes is indicated schematically in FIG. 9). Similarly, the end rod 94 may be also moved vertically and horizontally, and it may also be tilted. Further, the end rod 94 may even be rotated around its own axis. This latter is illustrated only partly and schematically in FIG. 9 showing an electric motor 85, the tilting mechanism 86 and the vertical moving mechanism 88. The horizontal movement of the end rod 94 towards the chuck 24, as the discharge tube 2 is wound up, is ensured by a feed screw 83 driven by an electric motor 84. Similar mechanisms are applied to position the chamber 92. In short, the mechanism for moving the first clamping means 90 allow the relevant parts of the first clamping means to be moved in any X,Y,Z direction.

In short, the first clamping means may occupy arbitrary positions under the control of a control means for synchronizing the operation of the controllable support means. The control system of the apparatus is illustrated schematically in FIG. 10. The control means itself may be realized as a microprocessor 102 which controls the operation of the electric motors or actuators 104–106 for positioning the first clamping means 90 and the second clamping means 91 (see also FIG. 9). Beside the movement of the first clamping means 90 and the second clamping means 91, the microprocessor 102 also controls the actuators 108–111 of the heating and cooling means to achieve a desired radius or direction of curvature of the bending sections, when these are heated to the softening temperature. Further, temperature and position sensors 112–115 may be provided to monitor the temperature of the softened sections and the position of those ends of the bending section which is not clamped, and hence its position is not available to the control means.

The microprocessor 102 embodying the control means may also be equipped with a suitable memory 101 for storing a computer program for implementing the method, and a user interface 103. The user interface 103 may have a keyboard and a display, in a known configuration.

In order to improve the bending of the softened section of the discharge tube, the first clamping means may further comprise a support member for exerting at least partly a bending moment onto the first bending section. Such a support member may be a rim 32 of a guiding aperture 26 of the first clamping means, as shown in FIG. 6. In this case, the bending force corresponding to the force F3 in FIG. 8 generating the bending moment is applied to the bending section essentially at the end towards the first clamping means, while the bending force corresponding to the force F2 in FIG. 8 is applied on the bending section by the rear parts of the first clamping means, essentially where the discharge tube is still in a solid state, and has not yet melted.

Figure 12:
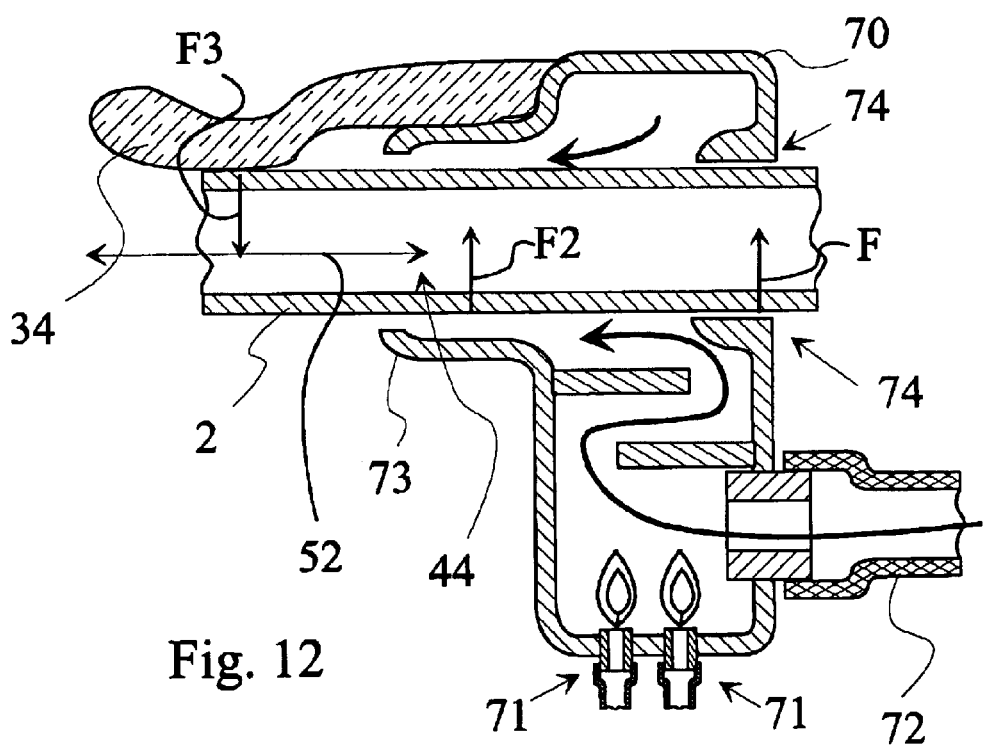
FIG. 12 is a schematic cross section of another embodiment of the heating means used in the apparatus of FIG. 9.

Alternatively, the support member may be a separate bending support 34 attached to the first clamping means at a distance from the first end 44 of the first bending section 52, as shown in FIG. 12. Here the bending force F corresponding to the force F2 in FIG. 8 is applied on the bending section by the rear parts of the first clamping means, as in the above example, but this force F is transferred to the end 44 of the bending section 52 by the still solid portions of the discharge tube 2 within the chamber 70.

The apparatus 100 also comprises cooling means 95 for cooling at least part of the bent sections of the first bending section to a temperature below the solidification temperature. The cooling means is realized with the air nozzles 62 directed to the ends of the softened bending sections. The air nozzles 62 are also positioned relative to the actual bending section of the discharge tube portions 21,22 with appropriate mechanisms, which are controlled by the control means, i. e. the microprocessor 102.

The heating means 64 are arranged to provide different heating rates to different longitudinal or radial parts of the discharge tube, primarily to those parts which are in the vicinity of or correspond to the actual bending section. For example, it is foreseen to heat those parts of the bending section to a higher temperature which undergo a larger deformation, while keeping the inner parts, as the inner wall 55, somewhat closer to the solidification temperature. This helps to avoid the collapsing of the tube under the bending forces.

As mentioned above, it is advantageous if the first clamping means 90 also comprises the heating means 64. Exemplary embodiments of the combined heating and first clamping means are shown in FIGS. 11 to 18.

Figure 11:
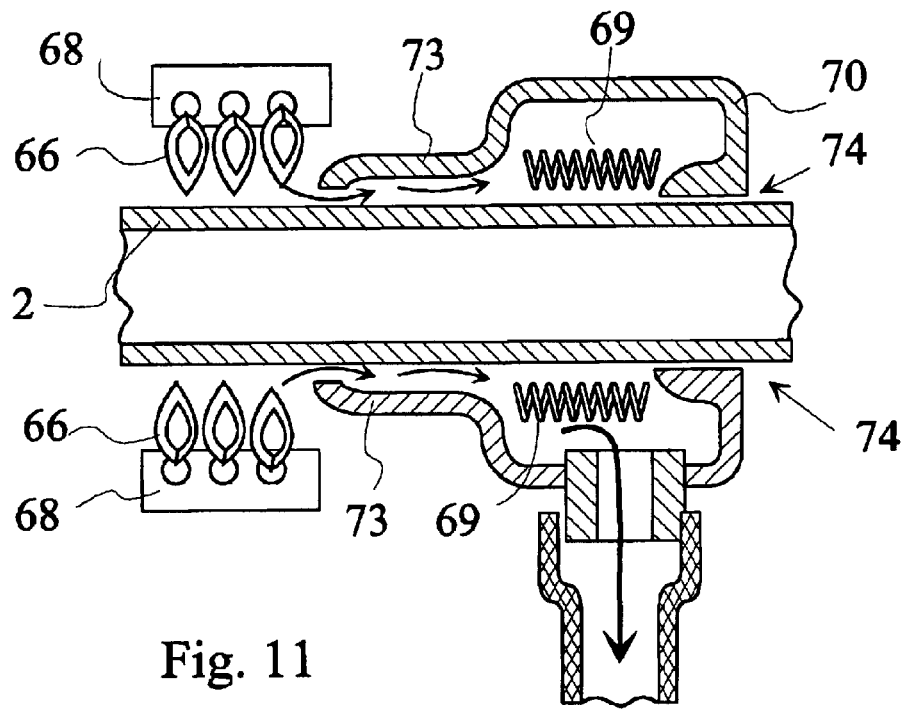
FIG. 11 is a schematic cross section of an embodiment of the heating means used in the apparatus of FIG. 9.

FIG. 11. shows a preferred version of the heating means and the clamping means. In this case suctions means, e. g. a suitable evacuation pump 65 (not shown in FIG. 11) is provided for directing the flames 66 of the gas burner 68 to the first end of the first bending section, which is inside the chamber 70. The evacuation pump 65 creates depression in the chamber 70 which forces the heated air from the flames 66 to enter the chamber 70 through the relative wide opening at the mouth 73 of the chamber 70. The chamber 70 has a rear aperture 74 which is relatively tightly fitting around the discharge tube 2, and only a smaller amount of air is sucked into the chamber 70 through the rear aperture 74. Electric filaments 69 may be also provided for additional heating effect, or for pre-heating the discharge tube 2.

The heating means may be realized in a number of further version, known per se. Such embodiments may comprise means for blowing hot air onto the discharge tube where the hot air is heated by a gas burner. Such a heating device is shown in FIG. 12. In this embodiment, the clamping chamber 70 comprises one or more gas burners 71. Hot air is blown into the chamber 70 through an air intake 72. The hot air is further heated by the flames of the burner 71. The heated air heats the discharge tube 2 within the chamber 70 and at the mouth 73 to the softening temperature. The bending forces F2 and F3 onto the tube are exerted by the bending support 34 and the rear aperture 74 of the bending chamber 70.

Figure 13:
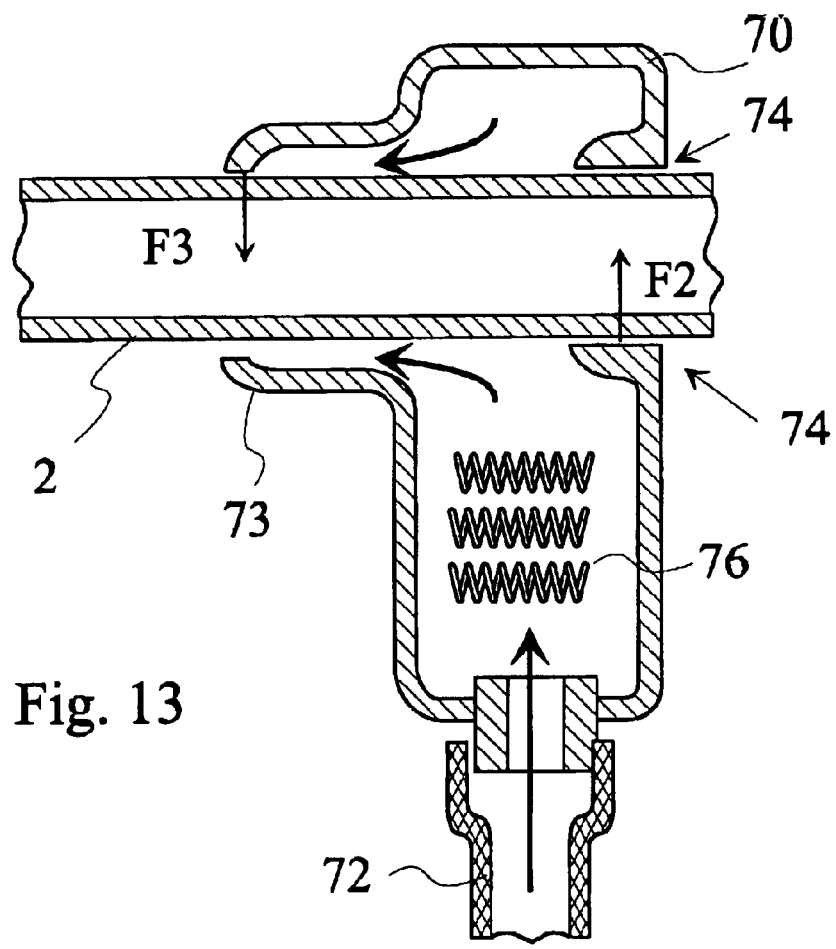
FIG. 13 is a schematic cross section of yet another embodiment of the heating means used in the apparatus of FIG. 9.

The embodiment shown in FIG. 13 operates in a similar fashion, but here the heating means in the chamber 70 comprises an electric heater 76. Again, means are provided for blowing hot air from the air intake 72 onto the discharge tube 2, e. g. a suitable pressure pump (not shown in FIG. 13). The hot air is heated by the electric heater 76. The pressure pumps 63 and 67 and their regulating valves 116,117 acting as the hot air blowing means are also controlled by the central microprocessor 102, as illustrated schematically in FIG. 10.

Figure 14:
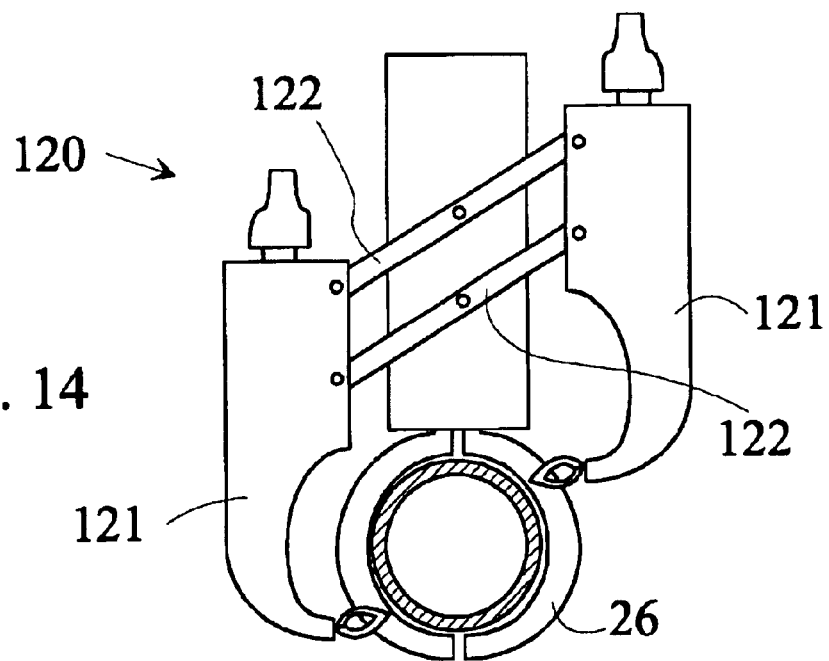
FIG. 14 is a cross section of the discharge tube, and a front view of yet another embodiment of the heating means used in the apparatus of FIG. 9.
Figure 15:
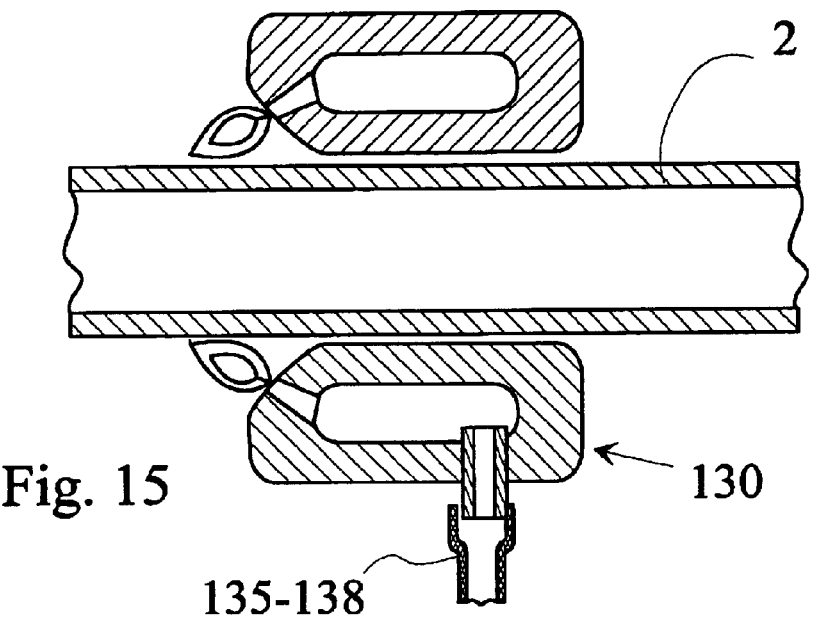
FIG. 15 is a schematic cross section of yet another embodiment of the heating means used in the apparatus of FIG. 9.
Figure 16:
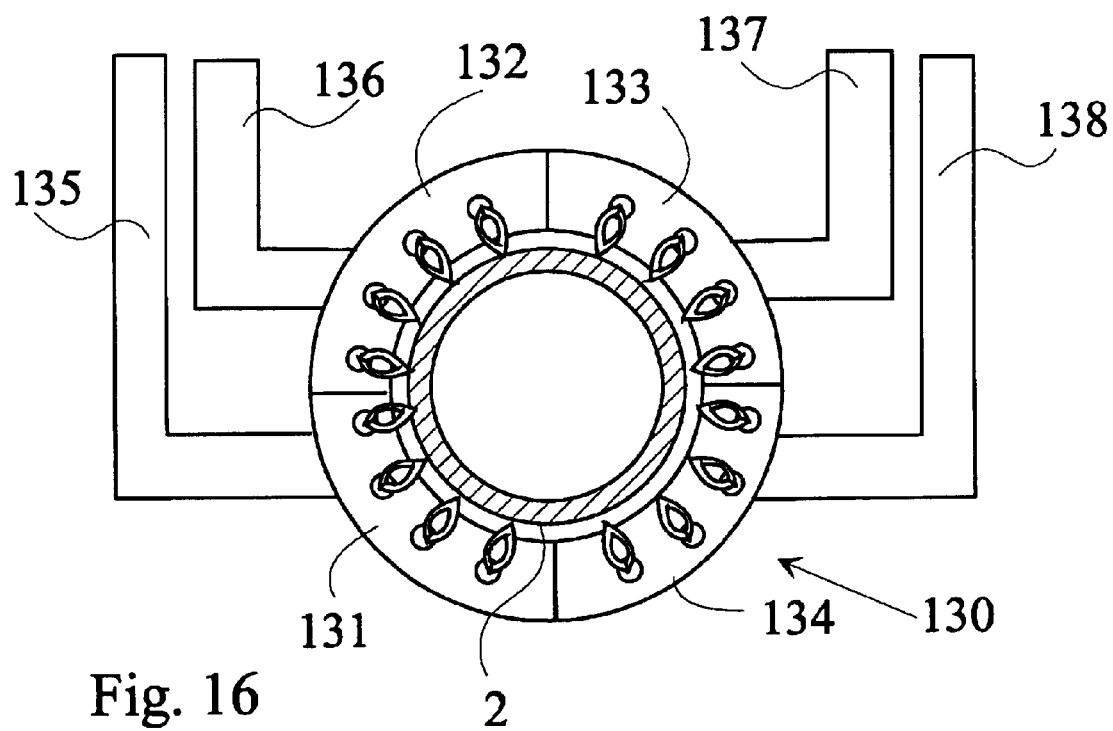
FIG. 16 is a cross section of the discharge tube, and a front view of yet another embodiment of the heating means used in the apparatus of FIG. 9.
Figure 17:
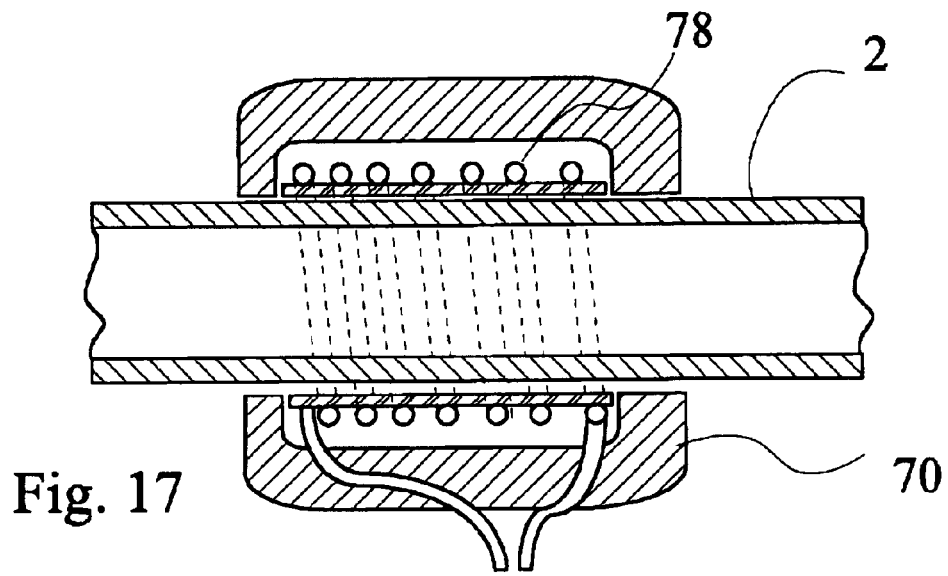
FIG. 17 is a schematic cross section of yet another embodiment of the heating means used in the apparatus of FIG. 9.

FIGS. 14 to 16 illustrate various embodiments of the heating means which employ a gas burner head 120. The gas burner head 120 in FIG. 14 comprise a pair of gas burners 121 arranged on parallel hinged arms 122. This simple mechanism provides an even heating of the discharge tube 2 between the burners 121, as the burners 121 are swung by the hinged arms 122, so that no part of the discharge tube 2 is overheated. The reciprocating movement of the arms 122 is controlled by an appropriate actuator mechanism (not shown).

FIGS. 15 and 16 show an embodiment where the gas burner head 130 comprises multiple, separately controllable burners. This also facilitates the differentiated heating of the discharge tube 2. The burner head 130 consists of four separate segments 131–134 which are fed by separate gas feed tubes 135–138. The segmented nature also allows the splitting of the burner head 130 which facilitates the insertion of the discharge tube 2 into the burner head 130 at the start of the winding process.

The application of hot air or burning gas as the heat transfer medium is not strictly necessary. In an embodiment shown in FIG. 17, an electric filament 78 functioning as the heating means in the chamber 70 is arranged closely to the discharge tube, so as to heat the discharge tube through thermal radiation or convection.

Figure 18:
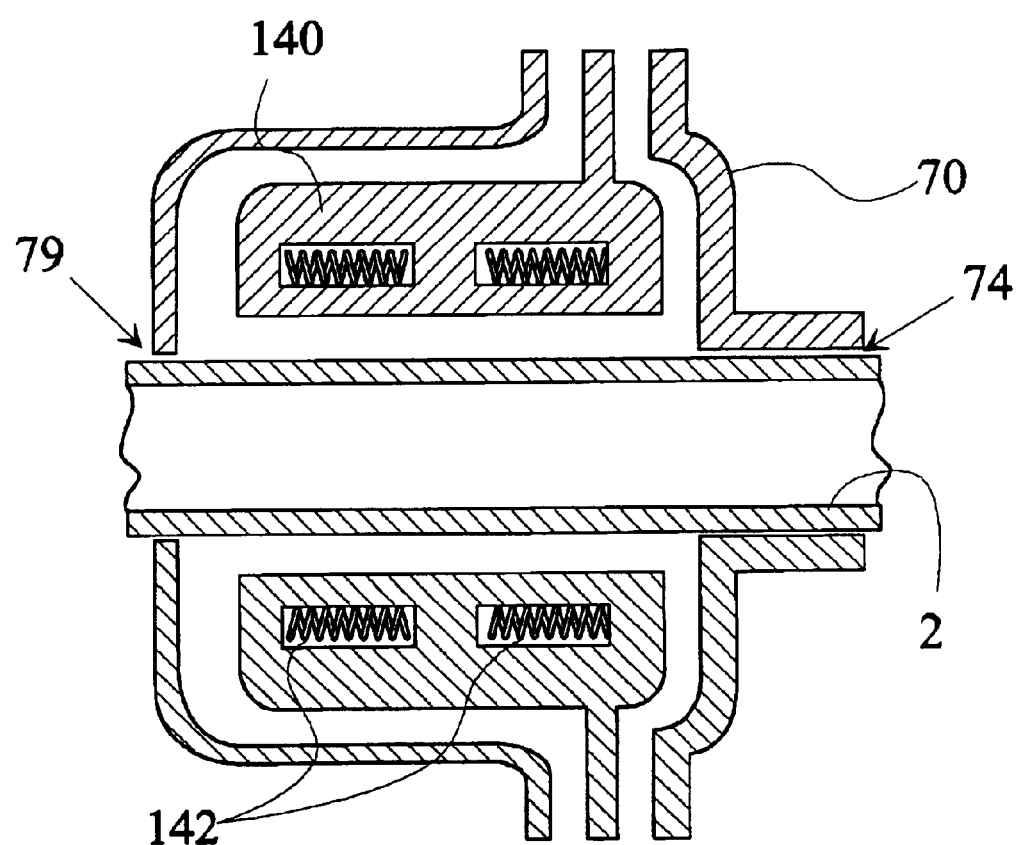
FIG. 18 is a schematic cross section of yet another embodiment of the heating means used in the apparatus of FIG. 9.

FIG. 18 illustrates a further embodiment of the heating means. In this version, the chamber 70 has a relatively tight exit aperture 79 in addition to the rear aperture 74. Gas with a high thermal conductivity, e. g. helium is circulated between the discharge tube 2 and a heating member 140 which improves the heat transfer towards the discharge tube 2. The heating member 140 itself is heated by the electric filaments 142.

The cooling means 95 shown in FIG. 9 may also be realized in a number of embodiments. The air nozzles 62 is an example where the cooling means 95 comprise means for blowing cooling gas, preferably cold air, on at least a part of the bent sections of the first bending section (see also FIGS. 5 to 7). Preferably, those parts of the softened bending section must be cooled which are already in the desired shape. By cooling these parts below the solidification temperature, the bending section remains short, and the bending process may be controlled. FIG. 19 shows an embodiment where the cooling means is realized with an air cooler 150 consisting of two hollow half-bodies 151, 152 provided with a number of bores 153. The half-bodies has a side profile according to the outer contours of the discharge tube 2. Air is blown on the discharge tube 2 through the bores 153 with the help of a pressure pump 165 (not shown in FIG. 19).

FIG. 20 show another version where the cooling means comprise a spray head 154 for spraying cooling liquid on at the first bending section. This is similar to the embodiment shown in FIG. 19 with the difference that liquid (mostly water) is pumped through the nozzles 155 by a suitable pressure pump (not shown).

Similar to the heating means 64, it is preferred to arrange the cooling means 95 to provide different cooling rates to different longitudinal or radial parts of the discharge tube which allows a fine-tuning of the bending process.

The first clamping means 90 may be provided with means for pre-heating the discharge tube to a temperature below the softening temperature. For this purpose, the first clamping means 90 may surround the non-softened parts of the discharge tube 2 on portions longer than shown in FIGS. 5 to 18. The first clamping means 90 may contain the free ends 9, 10 of the discharge tube entirely, as it will be shown with reference to FIG. 23.

Not only the end rod 94, but the whole first clamping means 90 may be arranged to rotate around the principal axis of the straight sections of the discharge tube 2, i. e. around those sections which have not yet been bent. If the exit aperture of the first clamping means 90 is not completely round, or it is provided with certain surface structures, the rotating of the first clamping means 90 will result in the appearance of a spiral or braid-like form on the discharge tube 2 on the end product.

From the above it is apparent that the proposed apparatus comprises first clamping means for positioning a first end of a bending section of the discharge tube in an oriented position relative to the position of a second end of the bending section and for exerting a bending moment on the first end. The apparatus is also equipped with a second clamping means for positioning an end of a starting section of the discharge tube in an oriented position relative to another end of the starting section. Heating means are provided for heating the bending section to a softening temperature, and controllable support means for positioning the first and second clamping means in predetermined positions relative to each other, and relative to the ends of the softened section being heated by the heating means. Finally, control means are provided for synchronizing the operation of the controllable support means, and thereby the position and movement of the first and second clamping means and the heating and cooling means to achieve a desired radius or direction of curvature of the bending sections according to the method explained above when the bending section of the discharge tube is heated to the softening temperature.

The end rod 94 of the first clamping means 90 acts as end fastening means for positioning the ends of the discharge tube relative to the chamber 92, and thereby relative to the first bending section. It is the end rod 94 which stabilizes the ends 31 of the tube portions 21,22 as the bending sections are being melted, and contributes to the clamping function of the chamber 92. Further, the pushing force is also effected on the discharge tube 2 by the end rod 94, when the discharge tube 2 is fed through the chamber 92.

Figure 21:
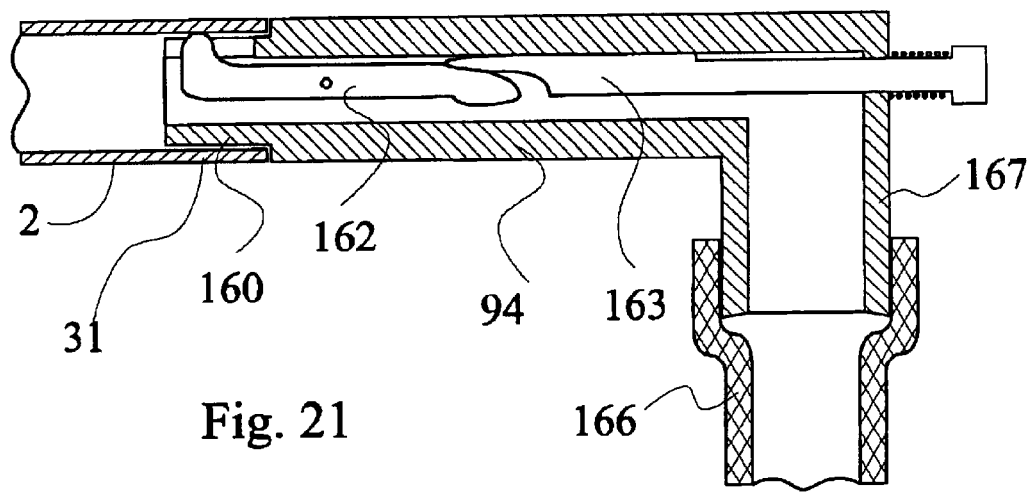
FIG. 21 is a cross section of the end fastening means used in the apparatus of FIG. 9.

As best seen in FIGS. 9 and 21, the end rod 94 is formed as a substantially straight hollow rod with a diameter not larger than the diameter of the discharge tube 2. The end rod 94 is at least as long as the maximum length of the softened bending sections. In this manner, the end rod 94 is capable for passing through the heating means, and allows the bending of even the last sections of the discharge tube 2 up to its very end 31. The end rod 94 has an annular flange 160 for insertion into the ends 31 of the discharge tube 2. Anchoring means are provided for securing the ends 31 of the discharge tube 2 on the annular flange 160. The anchoring means may be realized as a tightening tongue 162, shown in FIG. 21, activated by a pin 163. The operation of the anchoring means is also controlled centrally, by pushing or pulling the pin 163 with a known mechanism. There is also a sealing 161 between the discharge tube 2 and the flange 160 of the end rod 94 as shown in FIG. 22.

Figure 10:
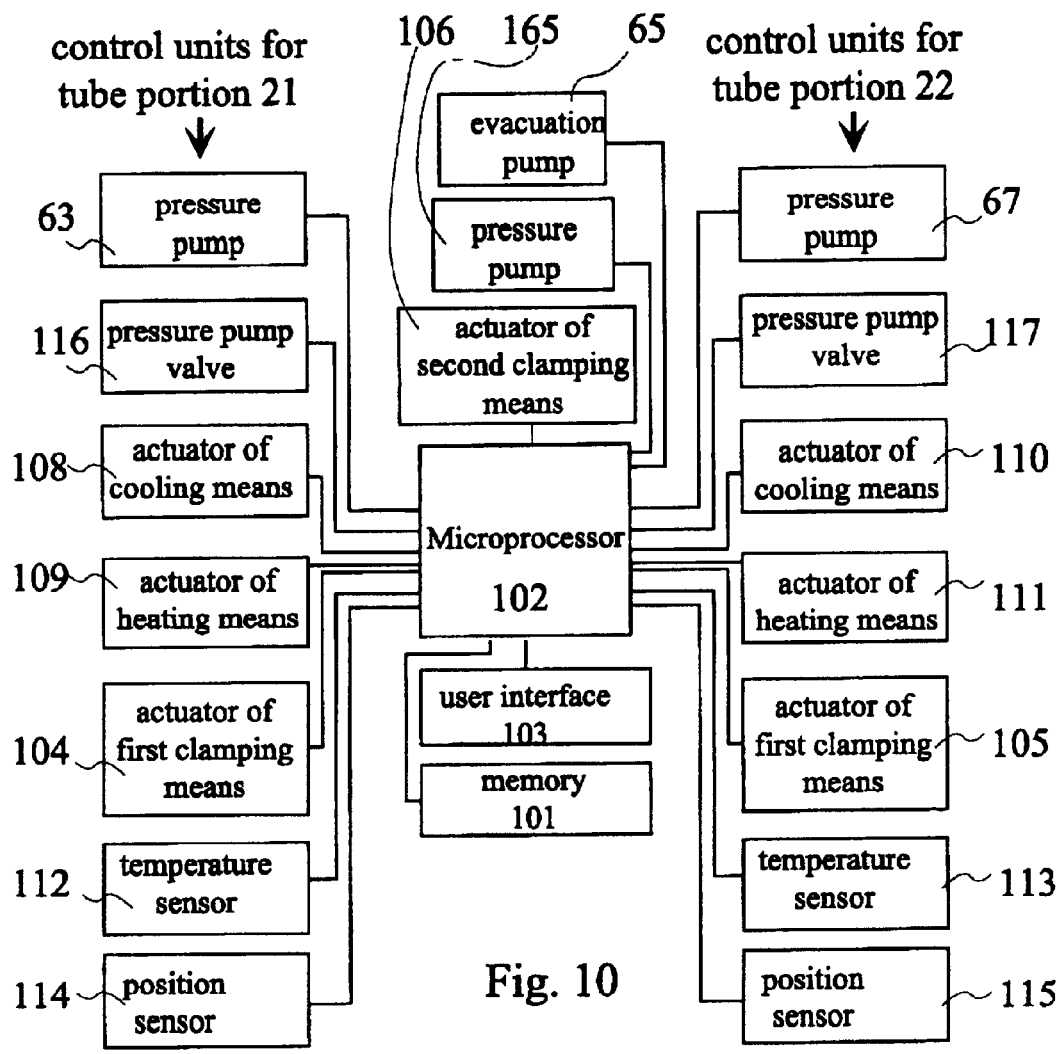
FIG. 10 is a schematic diagram illustrating the functional relation between certain elements of the discharge tube manufacturing apparatus of FIG. 10.
Figure 22:
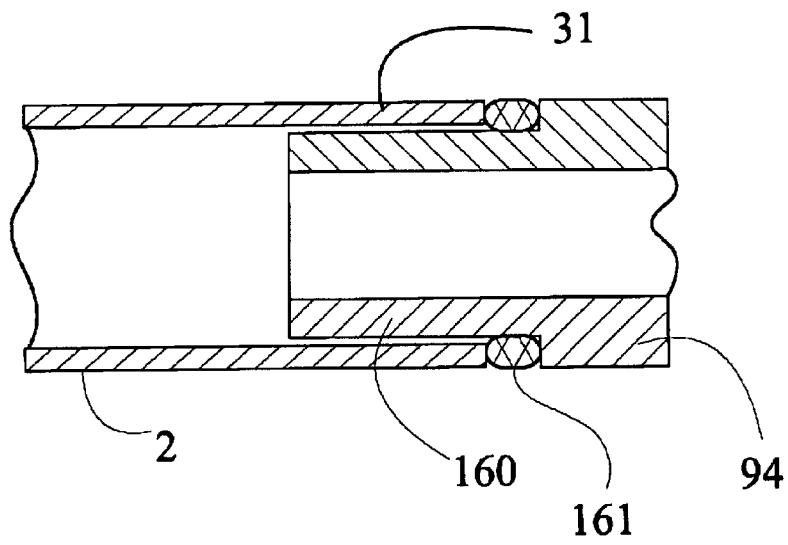
FIG. 22 is an enlarged part of FIG. 21.

The sealing 161 plays a role when the apparatus are equipped with means for varying the pressure within the discharge tube, preferably a pressure pump 165 (not shown in FIGS. 21 and 22). As illustrated in FIG. 10, the pump 165 is also controlled by the microprocessor 102, and it is connected to the internal volume of the end rod 94, and therewith to the internal volume of the discharge tube through a pressure tube 166 and a connecting flange 167. The internal pressure of the discharge tube may influence the bending properties of the softened bending section of the discharge tube 2. For example, the bending section may effectively be prevented from collapsing by a certain over-pressure within the tube. The variation of the pressure may be also used to adjust the diameter of the discharge tube at the softened bending section.

Figure 23:
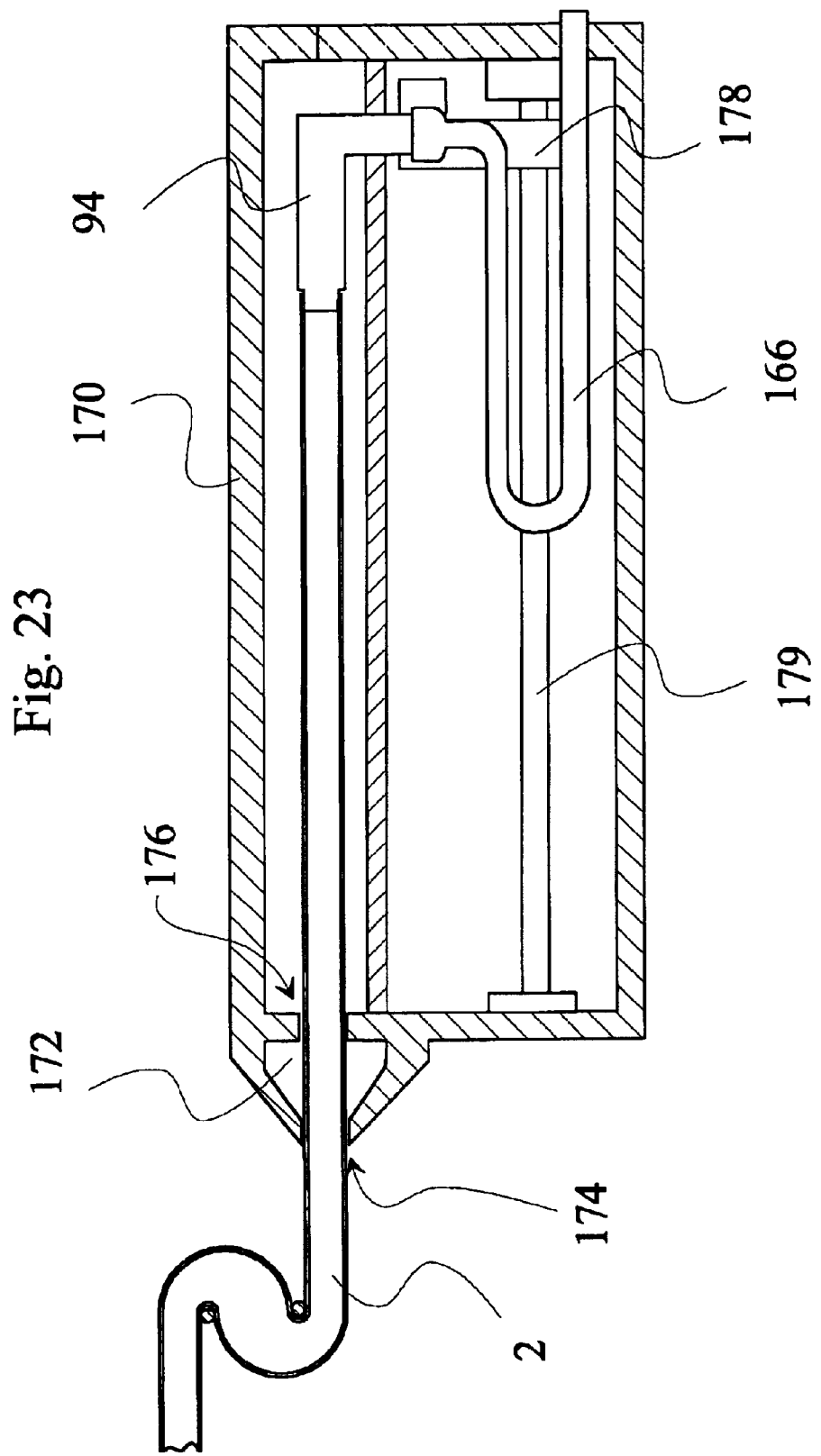
FIG. 23 is a cross section of the discharge tube, and cross section of an embodiment of the means used for pre-heating the discharge tube in the apparatus of FIG. 9.

If the apparatus also includes pre-heating means for the discharge tube, it is preferred if the first clamping means 90 are equipped with a heating chamber for pre-heating the discharge tube. Such a heating chamber 170 is shown in FIG. 23. Here, the complete remaining, non-wound length of the discharge tube 2 is within the heating chamber 170. A constant temperature somewhat lower than the softening temperature of the discharge tube 2 is provided in almost of the whole inner volume of the chamber 170. The pre-heating within the chamber is effected in a known manner, e. g. with internal heating elements or with external heating sources. The chamber 170 is equipped with a further smaller heating compartment 172 where the exiting tube section is heated to the softening temperature. In this case, the input aperture 174 and the exit aperture 176 of the heating compartment act as the clamping mechanism of the first clamping means 90.

The heating compartment 172 may also act as an intermediate heating step only, where the final heating of the discharge tube 2 to its softening temperature is effected by external heating means. The heating of the heating compartment may be done similarly to the heating means shown with reference to FIGS. 11 to 18.

With the pre-heating chamber 170 shown in FIG. 23, the role of the controllable support means is partly taken over by internal guiding means for guiding the discharge tube 2 in the heating chamber 170. This guiding means is embodied by the sliding mechanism feeding the end rod 94 within the chamber 170, towards the heating compartment 172 and thereby feeding the discharge tube through the heating compartment 172. The exemplary sliding mechanism on the figure comprises an end rod support 178 and a feed screw 179 rotated by a motor (not shown).

The invention is not limited to the shown and disclosed embodiments, but other elements, improvements and variations are also within the scope of the invention. For example, the proposed method and apparatus is well suitable for manufacturing not only double helix shaped lamps, but other lamps with different coil-like or arbitrary other shapes as well.

What is claimed is:

1. A method of forming a discharge tube for a low-pressure discharge lamp, the discharge tube having at least one curved section, the method comprising the steps of:
   fastening a first end of a first bending section of the discharge tube with first clamping means,
   holding a second end of the first bending section of the discharge tube in an oriented position, the second end being opposite the first end,
   heating the first bending section to a softening temperature,
   exerting the bending moment of the softened first bending section between the first end and the second end of the softened first bending section for achieving the desired radius or direction of curvature of the first bending section, in which
   the holding of the second end of the softened first bending section and the exertion of the bending moment on the softened first bending section is effected at least partly with a re-solidified second bending section of the discharge tube, the re-solidified second bending section being adjacent to the softened first bending section
   forming a central portion of the discharge tube to an S-shape in a molding form before bending with the bending movement.

2. The method of claim 1 in which the bending moment is exerted on the softened first bending section at least partly by a wall part of the first bending section.

3. The method of claim 1 in which the bending moment is exerted on the softened first bending section at least partly by a support member of the first clamping means.

4. The method of claim 3 in which the support member is a rim of a guiding aperture of the first clamping means.

5. The method of claim 1 comprising the following steps:
   the discharge tube is initially fastened at a third end of a starting bending section with first clamping means and
   a fourth end of the starting bending section of the discharge tube is fastened, the fourth and being opposite the third end,
   the starting bending section is heated to a softening temperature,
   a bending force is exerted between the third end and the fourth end of the softened starting bending section to achieve the desired radius or direction of curvature of the starting bending section, and
   the fastening of the fourth end of the softening starting section and the bending force to the softened starting section is effected with second clamping means.

6. The method of claim 1 in which the first end of the softened first bending section is translated or tilted during the bending of the first bending section.

7. The method of claim 1 in which the discharge tube is formed as a double helix, and the starting section is adjacent to the central portion, and two legs of the discharge tube on two sides of the central portion are wound into the double helix form simultaneously.

8. The method of claim 7 in which the central portion of the discharge tube is formed to a cold chamber portion, and the starting sections of the discharge tube are held in oriented position by fastening the cold chamber portion.

9. The method of claim 1 in which the softened section is shifted along the principal longitudinal axis of the discharge tube substantially continuously.

10. The method of claim 1 in which the bending section is heated with any of the group containing hot air, gas flames or heating wire.

11. The method of claim 1 in which the bent portions of the discharge tube are actively cooled to a temperature below the solidification temperature after bending.

12. The method of claim 1 in which the bent section is cooled with any of the group containing cold air, liquid spray, convection cooling, radiation cooling.

13. The method of claim 1 in which the length of the softened first bending section is less than six times the diameter of the discharge tube.

14. A method of forming a discharge tube for a low-pressure discharge lamp, the discharge tube having at least one curved section, the method comprising the steps of:
   fastening a first end of a first bending section of the discharge tube with first clamping means,
   holding a second end of the first bending section of the discharge tube in an oriented position, the second end being opposite the first end,
   heating the first bending section to a softening temperature,
   exerting the bending moment of the softened first bending section between the first end and the second end of the softened first bending section for achieving the desired radius or direction of curvature of the first bending section, in which
   the holding of the second end of the softened first bending section and the exertion of the bending moment on the softened first bending section is effected at least partly with a re-solidified second bending section of the discharge tube, the re-solidified second bending section being adjacent to the softened first bending section,
   portions of the discharge tube are pre-heated to a temperature below the softening temperature before bending.

15. A method of forming a discharge tube for a low-pressure discharge lamp, the discharge tube having at least one curved section, the method comprising the steps of:
   fastening a first end of a first bending section of the discharge tube with first clamping means,
   holding a second end of the first bending section of the discharge tube in an oriented position, the second end being opposite the first end,
   heating the first bending section to a softening temperature,
   exerting the bending moment of the softened first bending section between the first end and the second end of the softened first bending section for achieving the desired radius or direction of curvature of the first bending section, in which
   the holding of the second end of the softened first bending section and the exertion of the bending moment on the softened first bending section is effected at least partly with a re-solidified second bending section of the discharge tube, the re-solidified second bending section being adjacent to the softened first bending section,
   the internal pressure of the discharge tube is varied during the bending of the first bending section.

* * * * *